United States Patent

[11] 3,628,919

| [72] | Inventors | William D. Beauchamp<br>Syracuse;<br>Eugene B. Port, Solvay; Carlton J. Howard,<br>Liverpool, all of N.Y. |
|---|---|---|
| [21] | Appl. No. | 771,430 |
| [22] | Filed | Oct. 29, 1968 |
| [45] | Patented | Dec. 21, 1971 |
| [73] | Assignee | Allied Chemical Corporation<br>New York, N.Y. |

[54] CRYSTALLIZATION PROCEDURE FOR SODIUM CARBONATE PRECURSOR CRYSTALS
9 Claims, 1 Drawing Fig.

| [52] | U.S. Cl.............................................. | 23/301 R,<br>23/302 |
|---|---|---|
| [51] | Int. Cl.............................................. | B01d 9/02 |
| [50] | Field of Search.................................... | 23/301,<br>302, 300 |

[56] References Cited
UNITED STATES PATENTS

| 1,873,251 | 8/1932 | Allen et al. ................ | 23/302 |
|---|---|---|---|
| 2,704,239 | 3/1955 | Pike ............................ | 23/302 |
| 2,792,282 | 5/1957 | Pike ............................ | 23/302 |
| 3,236,590 | 2/1966 | Sopchak et al. ............. | 23/302 |
| 3,425,795 | 2/1969 | Howard et al. .............. | 23/302 |

*Primary Examiner*—Norman Yudkoff
*Assistant Examiner*—R. T. Foster
*Attorneys*—Gerard P. Rooney and Philip R. Arvidson ABSTRACT: Invention relates to an improved crystallization procedure for the preparation of sodium carbonate precursor crystals such as sodium bicarbonate, sodium sesquicarbonate, anhydrous sodium carbonate, and sodium carbonate monohydrate by a crystallization procedure which involves providing in the crystallization system a sufficient amount of proper quality sodium carbonate precursor seed crystals of a particle size less than about 10 mesh to reduce the adverse modifying effect on crystal quality of organic carbon on sodium carbonate precursor crystals formed.

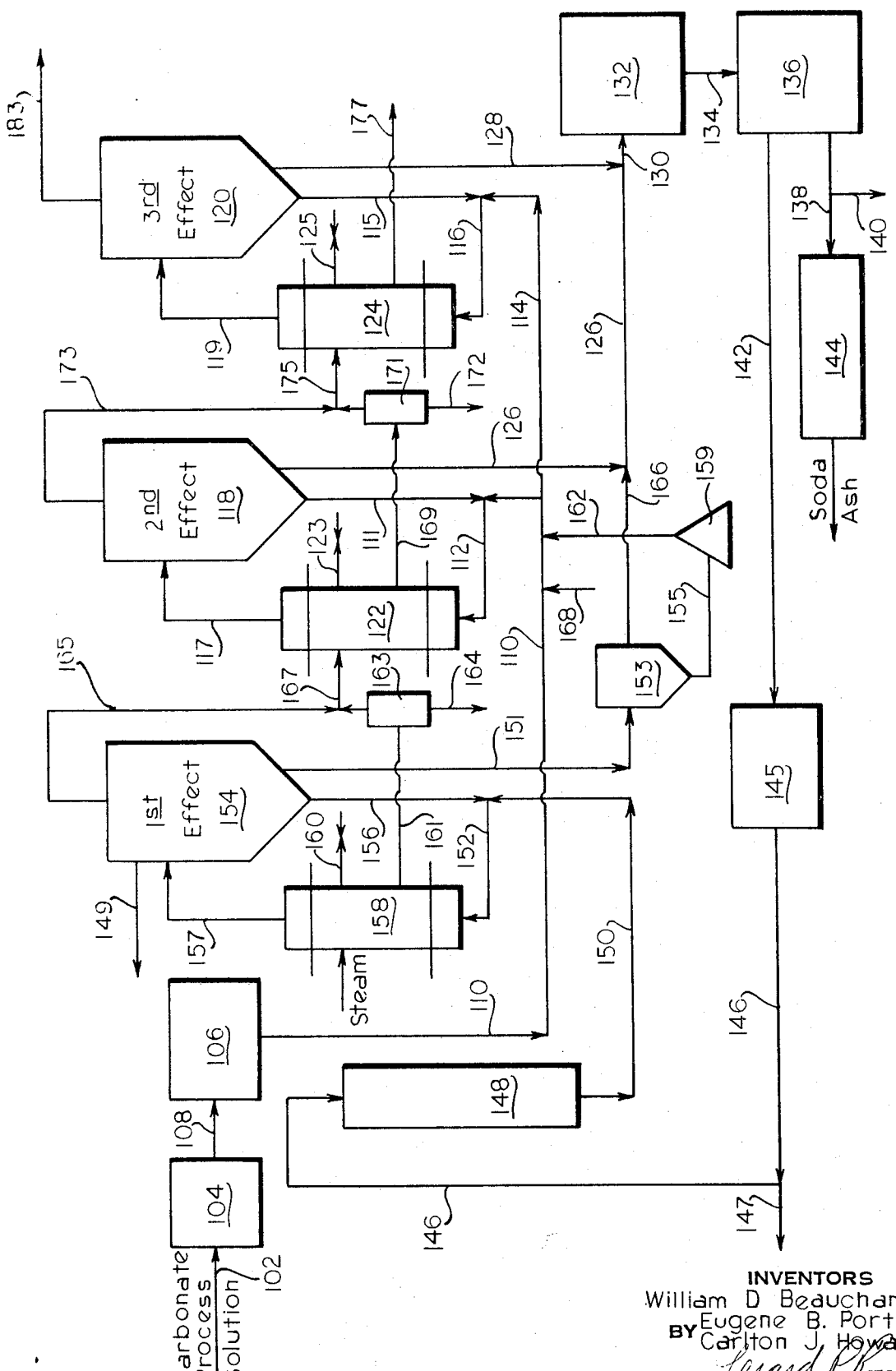

CRYSTALLIZATION PROCEDURE FOR SODIUM CARBONATE PRECURSOR CRYSTALS

Trona, as found in the Green River area of Wyoming consists mainly of sodium sesquicarbonate $$(Na_2CO_3 \cdot NaHCO_3 \cdot 2H_2O)$$

A typical analysis of trona contains:

| Constituent: | Percent |
|---|---|
| $Na_2CO_3$ | 45 |
| $NaHCO_3$ | 36 |
| $H_2O$ | 15.30 |
| $NaCl$ | 0.04 |
| $Na_2SO_4$ | 0.01 |
| $Fe_2O_3$ | 0.14 |
| Organic matter | 0.30 |
| Insolubles | 3.20 |

In addition to a water-insoluble fraction resulting from the association of the trona with shale stringers or beds in the trona deposits, organic matter in the order of about 0.3 percent is present which would contaminate the desired product, e.g., sodium carbonate precursor crystals, unless it is removed. It is believed that the organic matter in the trona consists of kerogenaceous material containing monocarboxylic acids, dicarboxylic acids, certain unsaturated acids, steroids and certain rosin acids. Furthermore, in order to improve the desired physical properties of the sodium carbonate precursor crystals, it is customary to add to the solution to be crystallized organic surface active agents, such as alkylated benzene sulfonate, as crystallization modifiers to improve crystallization. Likewise, organic defoaming agents and other organic impurities picked up in the circulating liquors in the plant are present in the solution prior to and during crystallization. The presence of these organics to any appreciable extent is not desired because they adversely affect crystal quality, e.g., discoloration of the crystals and reduction in bulk density, which may limit the extent of use of the precursor crystals, particularly if they are to be converted to dense soda ash for use in the glass industry.

Various methods previously have been proposed to reduce the organics to an acceptable level so as not to adversely affect the crystal quality. For instance, in U.S. Pat. Nos. 2,962,348 and 3,131,996 the crude trona is decarbonized at relatively high temperatures. These patents disclose that at temperatures in the order of about 400° to about 800° C., the organic matter present in the crude trona is substantially removed by oxidation and distillation. This method, of course, would involve a high-heat requirement, thus increasing the cost of the ultimate product. Also, heating the trona in excess of 400° C., while eliminating substantial amounts of the carbon in the crude trona, substantially increases the quantity of water-soluble silica in the crude sodium carbonate, the removal of which is difficult, requiring the bleeding off of substantial amounts of the mother liquor separated from crystallizers. This results in a loss of valuable carbonate values in the discarded mother liquor.

Another method proposed is that described in U.S. Pat. No. 3,028,215, wherein the sodium carbonate precursor crystals containing organic impurities are subjected to a high-temperature calcination, i.e., temperatures in the order of about 400° to about 800° C., wherein the organic impurities are either volatilized or converted to a coke which allegedly does not present any problem in the utilization of the resulting soda ash in commerce. However, the crystal quality is not significantly improved because the organics are present during crystallization at which time their adverse effect is realized on the quality of the crystal produced during the crystallization. Also, the equipment and heat requirements to calcine the contaminated sodium carbonate precursor crystals are significant, particularly when the production rate is in the magnitude of more than 1,000 tons of product per day.

Still another method for reducing organics is that described in U.S. Pat. No. 3,260,567, wherein the crude trona is first converted to crude sodium carbonate at relatively low temperatures, i.e., in the order of about 150° to 200° C., and then the crude sodium carbonate is dissolved in an aqueous solution. After removal of the insolubles by clarification, the organics are substantially reduced by passing the solution of crude sodium carbonate through a bed of adsorbent, such as activated carbon, prior to crystallization. After crystallization the mother liquors are recycled through the adsorbent beds to reduce the buildup of the organics in the mother liquor stream prior to a second crystallization. While there is little, if any, necessity to bleed off any mother liquor due to organics building up in the recycled mother liquor, special equipment is necessary to reactivate the large amounts of the activated carbon when it no longer effectively performs its function. Also, there is needed to effect this operation an increase in the necessary processing equipment due to the large volumes of liquid, i.e., fresh feed solution as well as recycled mother liquor, to be handled. It is estimated that to handle this recycled mother liquor and fresh feed the number of carbon towers would be in the order of approximately twice that needed for the lesser volume of fresh feed alone.

A still further method is that described in copending Pat. application, Ser. No. 757,511, filed Sept. 4, 1968, hereby incorporated by reference. In the process described therein the presence of organic impurities in a carbonate process solution has been substantially obviated by the discovery that the crystal quality of sodium carbonate precursor crystals is affected adversely more at lower crystallization temperatures than at the higher temperatures. In practice, that invention involved the formation of a first crop of sodium carbonate precursor crystals from a carbonate process solution, separating these crystals from mother liquor and subjecting the mother liquor to crystallization conditions including temperatures higher than those employed to obtain the first crop of precursor crystals to affect crystallization of a second crop of precursor crystals. The precursor crystals were not seriously adversely affected by the organic carbon impurities which remained in the carbonate process solution following treatment with activated carbon.

Notwithstanding these prior processing techniques, some of which involve a substantial cost in capital equipment and consumption of time, the effectiveness of the removal of organic matter is reduced, particularly when the trona ore quality is poor or processing upsets occur, when the carbonate process solution has objectionable and nonadsorbable organic impurities and resort must be made to the use of the aforementioned organic-containing crystal modifiers.

It has now been found that by supplying a sufficient number, i.e., surface area, of proper quality sodium carbonate precursor seed crystals in the crystallization system thereby reducing nucleation in the carbonate process solution, growth on the seed crystals results in a better product quality crystal than if normal nucleation is permitted under the desired crystallization conditions. That is, the quality of the seed crystals added to the crystallization system to a large extent determines the degree of product quality. In one embodiment of the present invention seed crystals having desirable physical characteristics of the sodium carbonate precursor crystals to be formed in the crystallization system are added to the crystallization units of a multiple effect crystallization system operated at the lower crystallization temperatures so that crystallization of the carbonate process solution in these crystallization units is effected in the presence of the sodium carbonate precursor seed crystals.

In a preferred embodiment of the present invention crystallization of the sodium carbonate precursor crystals is effected in the crystallization system described in copending Pat. application, Ser. No. 757,511, filed Sept. 4, 1968, which disclosure is hereby incorporated by reference. In this preferred embodiment a portion of the sodium carbonate precursor crystals formed in the high-temperature crystallizer of a multiple effect crystallization system is added to the crystallizer units operated at the lower temperatures so that crystallization in the crystallizers operated at the lower temperatures is conducted in the presence of sodium carbonate precursor seed crystals of good quality, since it has been found that the crystals formed in the higher temperature crystallizers of the above process have better crystal quality than those formed in the lower temperature evaporator, particularly in the presence of organic contaminants. Also, in this preferred embodiment it has been found that it is not necessary to seed the high-temperature effect (first effect) to achieve good crystal quality. The first effect has been found to seed itself and come into balance in the production of the sodium carbonate precursor crystals.

The source of the sodium carbonate precursor crystal seed employed in the crystallization system to promote growth on the seed crystals is not critical. The seed crystals may be derived from any commercially available sodium carbonate precursor crystals which are to be formed in the crystallization system, i.e., sodium bicarbonate, sodium sesquicarbonate, anhydrous sodium carbonate, and sodium carbonate monohydrate. Thus, if the desired sodium carbonate precursor crystals are sodium carbonate monohydrate, a good quality commercially available sodium carbonate monohydrate may be employed as the seed crystals in the crystallization system. A preferred source of the sodium carbonate precursor seed crystals is from the high-temperature crystallizer of the multiple effect crystallization system described in the above-mentioned copending patent application. In that process a portion of the crystals formed in the high-temperature crystallizer is passed to the lower temperature crystallizers after the crystals have been reduced in size sufficient to permit growth on the seed crystals.

The amount of seed crystals which may be added to the crystallization system may vary from about 2 to 25 percent, preferably 5 to about 20 percent, by weight based on the total weight of the sodium carbonate precursor crystals prepared in the crystallizer unit. The amount of seed crystals employed will depend on the surface area of the seed crystals added. That is, the greater the surface area due to smaller crystal particle size the smaller the amount of seed crystals necessary to permit growth during the crystallization operation. Preferably the seed crystals should have a particle size of less than about 10 mesh, preferably in the order of less than about 25 to 200 mesh (U.S. sieve size), with an especially preferred seed crystal particle size which passes through an 80-mesh screen.

The seed crystals may be added in the form of a slurry to the crystallization system, preferably containing approximately the same amount of solids which is allowed to form during the crystallization operation, i.e., 15 to 60 percent, preferably about 30 to 50 percent, solids.

By the phrase "carbonate process solution" is meant a substantially saturated aqueous solution from which the desired sodium carbonate precursor crystals, i.e., sodium bicarbonate, sodium sesquicarbonate, anhydrous sodium carbonate and sodium carbonate monohydrate, may be crystallized as the stable crystal phase and recovered from mother liquor. The crystallization procedure of the present invention is also applicable to sodium carbonate-sodium bicarbonate process solutions derived from other natural minerals such as nahcolite ($NaHCO_3$), thermonatrite ($Na_2CO_3 \cdot H_2O$), natron ($Na_2CO_3 \cdot 10H_2O$), and dawsonite ($NaAlCO_3(OH)_2$), particularly when these minerals are associated with or near kerogen type deposits. The carbonate process solutions derived from these minerals, including trona, contain varying proportions of sodium carbonate and sodium bicarbonate together with soluble organic impurities. The "carbonate process solution" may be prepared, as described hereinbelow, by various procedures and contains about 10 to 1,000, preferably about 10 to 500 parts per million organic carbon, basis sodium carbonate.

The FIGURE is a schematic of the preferred crystallization technique of the present invention.

In a typical trona processing operation a carbonate process solution which has been clarified and filtered is passed in series through crystallization units, typically "multiple effect" evaporator crystallizers. In general, three crystallizers or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The "effects" are numbered in the direction of steam flow, i.e., in a three crystallizer system the crystallizer operated at the highest steam temperature is designated the "first effect," the crystallizer operated at the intermediate steam temperature is designated the "second effect," and the crystallizer operated at the lowest steam temperature is designated the "third effect." As the carbonate process solution passes through the crystallizers a slurry of sodium carbonate precursor crystals is formed and passed to each succeeding crystallizer. The slurry is passed from one effect to the other in the chosen direction by a series of pumps. From the last effect the slurry, containing about 15 to 60 percent, preferably about 30 to 50 percent, solids, is allowed to settle. The sodium carbonate precursor crystals are separated and the mother liquor separated from the sodium carbonate precursor crystals is combined with the freshly filtered carbonate process solution which is to be fed to the crystallizers to effect crystallization of a second crop of precursor crystals.

Exemplary of the aforementioned prior art crystallization procedures for the processing of trona solutions may be found in the disclosures of U.S. Pat. Nos. 2,704,239 (crystallization of sodium bicarbonate); 2,770,524 (crystallization of anhydrous sodium carbonate); 2,639,217 and 3,028,215 (crystallization of sodium sesquicarbonate); and 2,343,080; 2,343,081; 2,962,348; 3,131,996 and 3,260,567 (crystallization of sodium carbonate monohydrate). In each one of these prior art processes, the carbonate process solution generally first enters the crystallizer operated at highest temperature (first effect) and passes in series in the form of a slurry through the crystallizers, each succeeding one being operated at a lower temperature than the previous one. In the event the solids content of the slurry which is being pumped through the crystallization unit becomes too thick or viscous a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted to soda ash. The mother liquor is then recycled to the system passing through the first effect evaporator crystallizer together with clarified and filtered carbonate process solution not previously treated in the crystallizer. In some processes a portion of the mother liquor is sent to dissolve additional trona.

In the above-mentioned copending application the carbonate process solution which has been clarified and filtered, is first fed for crystallization to the crystallizer(s) operated at the lower temperatures, e.g., the second and third effects of a multiple effect evaporator system, and the mother liquor separated from the sodium carbonate precursor crystals is then used as a feed liquor to the crystallizer(s) operated at the highest temperature, e.g., first effect. Thus, for any level of organic impurity in the crystallizer feed liquor, whether carbonate process solution or recycled mother liquor, crystal quality has been found best from the crystallizer operated at the highest crystallizing temperature.

The carbonate process solution may be subjected to crystallization in any of the well-known types of evaporative crystallizers commonly employed. Preferably, however, for purposes of economy, it is preferred in the operation of the present invention to employ as the crystallization system three evaporative crystallizers. However, it is possible to practice the present invention employing a greater or lesser number of crystallizers, the choice being one of economy.

Reference is now made to the FIGURE, which represents a flow diagram of the preferred crystallization system of the present invention for crystallizing sodium carbonate precursor crystals from carbonate process solution.

A substantially saturated carbonate process solution which will crystallize the desired stable crystal phase under the crystallization conditions chosen passes via line 102 through a crystallizer feed preheater 104 to crystallizer feed storage or surge tank 106 by line 108. From the crystallizer feed storage tank 106 the carbonate process solution is pumped to the second and third effect crystallizers 118 and 120, respectively, in parallel feed. Preferably, each of these effects 118 and 120 provides for a separate recirculation of carbonate process solution through the effects by withdrawing a slurry of the sodium carbonate precursor crystals via lines 111 and 115, respectively, from the bottom of each effect and pumping it back into the main bodies of these effects after combining it with the carbonate process solution from the feed tank 106 by lines 110 and 112 and by lines 110, 114 and 116, respectively. Seed crystals of the desired precursor crystals having a particle size of less than about 10 mesh, is introduced into feed line 110, via line 162. The seed crystals are added continuously as a slurry, containing about 40 percent solids by weight, to the feed liquor. Alternatively, seed crystals from a source other than the first effect may be employed and introduced into the system as a slurry via line 168. The combined streams to each of the effects, containing seed crystals, passes through heat exchanges 122 and 124, respectively, wherein each feed is heated indirectly with the condensing vapors from the preceding higher temperature crystallizer to bring the carbonate process solution to the desired crystallization temperature range.

The amount of recirculation in each effect may be controlled within limits, which in turn controls the so-called "flash range" of the crystallizers. The flash range is the difference in temperature between that prevailing in the crystallizer and that of the recirculating feed to the crystallizer. For instance, if the desired sodium carbonate precursor crystals are sodium carbonate monohydrate, the carbonate process solution entering the first effect and recycle first effect slurry are heated by saturated steam having a temperature of about 116° C. so that the mixture containing the recycled mother liquor separated from the precursor crystals is heated by the steam to a temperature of about 116° C. when it enters the first effect crystallizer 154. The temperature of the crystal slurry removed from this effect via line 151 is from about 105° to 109° C. This latter temperature is therefore that prevailing in the first effect. The condensate exiting via line 161 from the heat exchanger 158 is passed to flash tank 163. The steam from this flash tank is combined with the vapor from the first effect evaporator via line 165, and this combined vapor stream, at a temperature of about 99° C., enters heat exchanger 122 via line 167. The crystal slurry which leaves the second effect is at a temperature of about 88° to 96° C. Likewise, the condensate leaving heat exchanger 122 via line 169 is passed to second effect flash tank 171, and the steam from this flash tank, combined with the vapor leaving the second effect via line 173 enter heat exchanger 124 via line 175. This combined vapor stream is used to heat the carbonate process solution fed to the third effect crystallizer 120. The feed to this effect is heated to about 82° C. and the crystal slurry leaving this effect preferably is at a temperature of about 71° to 79° C. Thus, the preferred flash range in each of these effects is about 3° to 11° C.

The carbonate process solution, after being heated in the heat exchangers 122 and 124, is passed to crystallizers 118 and 120, via lines 117 and 119, respectively. Crystallization is effected under conditions to form the desired sodium carbonate precursor crystals in the form of a slurry. The crystal slurry from the second and third effects 118 and 120 is drawn off via lines 126 and 128 and passed to an agitated slurry holding tank 132 by line 130. Desirably, the slurry contains approximately 40 percent solids in a crystal slurry draw. The slurry is passed from the holding tank 132 via line 134 to separator 136, wherein the sodium carbonate precursor crystals are separated from the mother liquor. The precursor crystals are removed from separator 136 via line 138 and may be either removed via line 140 and dried and stored for future use or converted to soda ash in calciner 144.

The mother liquor solution removed from separator 136, substantially saturated with respect to the desired sodium carbonate precursor crystals and having a higher concentration of impurities than the carbonate process solution fed to the second and third effect crystallizers, is passed via line 142 to mother liquor storage tank 145. The mother liquor is pumped from the storage tank 145 and passed to mother liquor deaerator 148 via line 146. A portion of the mother liquor may be recycled to the dissolving unit via line 147, as will be discussed below concerning the use of the present crystallization system in combination with the various trona processes described in the prior art. The mother liquor from the mother liquor deaerator 148 is pumped via lines 150 and 152 through heat exchanger 158 to first effect crystallizer 154 via line 157. Recirculating is carried out in the first effect crystallizer by recirculating a portion of the slurry from crystallizer 154 via lines 156 and 152 through heat exchanger 158.

The slurry of sodium carbonate precursor crystals removed from crystallizer 154 by line 151 is either combined via line 166 with the slurry streams removed from the second and third effect crystallizers 118 and 120 and passed via line 130 to slurry tank 132 and treated as above to separate the crystals from the mother liquor; or a portion of slurry is diverted to slurry thickener 153 wherein it is passed via line 155 to ball mill, 159, or another apparatus capable of reducing the particle size of the precursor crystals to less than about 10 mesh. This slurry of seed particles is combined with feed streams 110 and 114 via line 162. Since it is not necessary to add seed crystals continuously to the crystallizer feeds, bypass valves are provided so that the slurry may pass directly through thickener 153 and be combined with the slurry streams from the second and third effect crystallizers via line 166. Alternatively, seed crystals of the desired particle size may be introduced in the form of a slurry into the system via line 168. As mentioned above, the seed crystals employed may be from a source other than from the present process, e.g., commercially available sodium carbonate precursor crystals, ground to the desired particle size.

Since the mother liquor separated from the sodium carbonate precursor crystals will contain concentrated amounts of impurities which will build up after a number of recycles, the first effect crystallizer 154 is provided with means for purging a portion of the recycled mother liquor from the system and passing this to waste via line 149. This may be accomplished by monitoring the impurities level in the recycled mother liquor so that it does not exceed a desired organic carbon level.

The condensate removed from the flash tanks 163 and 171 via lines 164 and 172, respectively, and from a heat interchanger 124, via line 177 depending on its purity and demand, is either returned to the boiler house or sent to a condensate storage for use as makeup water in the process. Vacuum is applied to the system via line 183 and can be provided, for example, by a conventional water cooled condenser and steam ejector combination. The noncondensables, during startup and operation, are removed by conventional manipulation of the valves on the noncondensed—gas vent lines 160, 123 and 125 from the steam space of the heat exchangers 158, 122 and 124. These lines may be connected to the vapor spaces of the corresponding effects or to the main vacuum line 183.

The carbonate process solution may be fed first to the second effect 118, and the slurry removed therefrom may be fed to the third effect 120 and the mother liquor separated from the sodium carbonate precursor crystals formed in the second and third effects is then sent to the first effect, 154. Still another method would be to send the carbonate process solution to the third effect 120, the mother liquor separated from the sodium carbonate precursor crystals sent to the second effect 118 to form a second crop of crystals and the mother liquor separated from these crystals sent to the first effect 154 to form a third crop of precursor crystals. In each case crystallization in the second and third effect is conducted in the presence of seed crystals of the desired sodium carbonate precursor crystals.

As mentioned above the crystallization procedure of the present invention is applicable to the preparation of precursor crystals of sodium carbonate, i.e., sodium sesquicarbonate, anhydrous sodium carbonate, sodium carbonate monohydrate and sodium bicarbonate, from Wyoming trona in a variety of ways previously proposed. For instance, if the desired precursor crystals are sodium sesquicarbonate, the crude trona is dissolved in an aqueous solution, preferably containing a recycled mother liquor, which solution contains an excess amount of carbonate over bicarbonate. The substantially saturated carbonate process solution containing sodium sesquicarbonate is then clarified and filtered and the filtrate is then passed to a crystallization system, described above, operated under conditions such that sodium sesquicarbonate crystallizes as the stable phase. The sodium sesquicarbonate crystals are separated from the mother liquor and a portion of the mother liquor is recycled to the dissolver to dissolve more crude trona and the other portion is passed to the high-temperature crystallizer to form a second crop of sodium sesquicarbonate crystals. The sesquicarbonate crystals may be dried and stored or they may be converted to soda ash, such as by calcination. Typical of the processes describing the preparation of sodium sesquicarbonate from trona which may employ the crystallization technique of the present invention are described in U.S. Pat. Nos. 2,346,140; 2,639,217; 2,798,790 and 3,028,215.

Another known method for the processing of trona in which a carbonate process solution may be subjected to the crystallization procedure of the present invention is the preparation of anhydrous sodium carbonate by maintaining the crystallization temperature in the crystallization units above about 109° C., the transition temperature at which anhydrous sodium carbonate is formed as the stable crystal phase. Typical of this process is the one described in U.S. Pat. No. 2,770,524.

Still another method in which the crystallization procedure of the present invention for the processing of trona process solution may be employed is in the preparation of sodium bicarbonate from crude trona which comprises dissolving the crude trona in an aqueous solution, preferably heated, containing sodium carbonate and sodium bicarbonate values. Preferably, a hot recycle mother liquor stream containing sodium bicarbonate and sodium carbonate values in which the bicarbonate content of the solution is greater than the amount originally found in crude trona. This may be accomplished by treating the recycled mother liquor either before or after said dissolution has taken place with carbon dioxide. The solution is clarified and filtered and then subjected to the crystallization procedure of the present invention under crystallization conditions such that the sodium bicarbonate in the carbonate process solution crystallizes out as the stable crystal phase. The sodium bicarbonate crystals are separated from the mother liquor and they are either recovered and dried or converted to sodium carbonate, such as by calcination. A portion of the mother liquor, preferably after treatment with carbon dioxide, is recycled to dissolve additional crude trona. The other portion of mother liquor is sent to a higher temperature crystallizer. Typical of this process which may be adapted incorporating the crystallization technique of the present invention is that disclosed in U.S. Pat. No. 2,704,239.

A further method in which the crystallization procedure of the present invention may be employed for producing sodium carbonate precursor crystals is the so-called "sodium carbonate monohydrate" method. In one form of a monohydrate trona processing operation which may use the present crystallization technique, raw trona which has been mined is first crushed. The crude trona is decarbonized wherein the crude trona is heated to convert the trona to crude sodium carbonate by driving off water and carbon dioxide. This crude product is then passed to a dissolver wherein the crude sodium carbonate is dissolved in an aqueous solution to prepare a substantially saturated carbonate process solution containing sodium carbonate. The carbonate process solution is then clarified and filtered.

This solution is then passed to crystallizers to effect crystallization of sodium carbonate monohydrate crystals as the stable crystal phase. The sodium carbonate monohydrate crystals are separated from the mother liquor which may be either recycled entirely to the crystallization zone or a portion of the mother liquor may be recycled to the dissolving unit. The sodium carbonate monohydrate crystals may be dried to remove excess moisture and stored or they may be converted to soda ash by drying to remove the water of hydration.

Crystallization of sodium carbonate monohydrate can be effected at temperatures ranging from about 36° to 109° C. For best results it has been found in the monohydrate process employing multiple effect evaporators that the first effect evaporator crystallizer be maintained at a temperature between approximately 70° to 109° C., preferably at a temperature of about 85° to 109° C., the second effect evaporator crystallizer maintained at a temperature of approximately 53° to 99° C., preferably at a temperature of 68° to 96° C. and the third effect evaporator crystallizer maintained at a temperature of 36° to 85° C., preferably at a temperature of 50° to 79° C. Exemplary disclosures of the monohydrate process in which the crystallization procedure of the present invention may be applicable may be found in U.S. Pat. Nos. 2,343,080; 2,343,081; 2,962,348; 3,131,996 and 3,260,567.

EXAMPLE

Carbonate process solution comprising a substantially saturated sodium carbonate solution was prepared from trona which had been dry mined and crushed to approximately a minus ¼-inch size. The crushed, mined, crude trona, containing approximately 85–90 percent sodium sesquicarbonate, was heated at elevated temperatures ranging from about 150° to about 500° C. to effect carbonization, i.e., drive off carbon dioxide and water, of the crude trona whereby the sesquicarbonate is converted to crude sodium carbonate. At temperatures of about 250° C., the required B.t.u. per pound of sodium carbonate formed was approximately 502 and the total residence time per pound of sodium carbonate formed was about 30 minutes to give substantially complete conversion of the sesquicarbonate to crude sodium carbonate.

The crude sodium carbonate was then dissolved in an aqueous solution forming a carbonate process solution containing approximately 28 to 30 percent sodium carbonate. The carbonate process solution containing undissolved grit and mud was passed through a clarification system to remove insoluble solids, such as shale and dirt, and drawn off as thickened mud from the system. Flocculents may be added to the carbonate process solution to assist in coagulation and settling of such solids. The clarified liquor was then filtered through activated carbon in order to reduce these impurities, such as organics, which interfere with the quality of crystals formed during crystallization. The treated sodium carbonate solution was collected after filtration in storage tanks and passed through a polishing filter to remove any entrained carbon in the solution. The solution was fed to a crystallizer containing seed crystals of sodium carbonate monohydrate having a particle size of about −80 mesh to form a slurry of sodium carbonate monohydrate. The slurry was agitated in the crystallizer to provide a uniform distribution of solids in the slurry.

The crystallizer was brought to the desired crystallization temperature at which point vacuum was applied. A sodium carbonate monohydrate slurry containing approximately 40 percent solids was removed. The crystals of sodium carbonate monohydrate were separated from the mother liquor. The crystals were reslurried with denatured alcohol and filtered. The alcohol washings were discarded and the crystals of monohydrate were allowed to dry at room temperature, after which the crystals were examined microscopically and their physical characteristics, e.g., bulk density and crystal geometry determined. Bulk density and organic carbon content of the product are the measures of product quality used in the evaluation of the monohydrate crystals. Pertinent data on the sodium carbonate monohydrate crystals prepared are presented in table I, below:

TABLE

| Laboratory run No. | 1A[a] | 1B[a] | 2 | 3 | 4 |
|---|---|---|---|---|---|
| Source of $Na_2CO_3$ | (1) | (1) | (1) | (1) | (1) |
| Evaporator temperature, °C. | 60 | 60 | 60 | 60 | 60 |
| Evaporator vacuum, in. Hg (approx.) | 25 | 25 | 25 | 25 | 25 |
| Activated carbon treated liquor | Yes | Yes | Yes | Yes | Yes |
| Feed liquor feed rate, est. ml./min. | 12 | 12 | 12 | 12 | 12 |
| Average condensate rate, ml./min. | 6.3 | 6.3 | 6.2 | 6.1 | 6.5 |
| Number crystal bed replacements | 5.3 | 3.3 | 5.7 | 4.3 | 4.3 |
| Monohydrate made, est. gms./liter/hr. | 195 | 190 | 195 | 190 | 205 |
| Seed monohydrate source [b] | (2) | | (3) | (4) | (2) |
| Seed monohydrate, gms./hour [c] | 20 | 0 | 20 | 20 | 40 |
| Bulk density, product monohydrate (approx.) g.p.l. | 1,050 | 850–900 | 1,000–1,050 | 900–950 | 1,000 |
| Organic carbon, p.p.m. basis $Na_2CO_3$: | | | | | |
| In feed liquor | 290 | 290 | 310 | 245 | 320 |
| In mother liquor | 580 | 575 | 575 | 520 | 670 |
| In monohydrate | 58 | 47 | 29 | 34 | 34 |

[1] Wyoming trona. [2] Church & Dwight. [3] 1st effect. [4] 3rd effect.

NOTES:
(a) Run 1 was made in two steps: With seeding (Run 1A) for 5.3 crystal bed replacements then standard run without seeding (Run 1B) for 3.3 bed replacements.
(b) Seed monohydrate was obtained by grinding to −80 mesh regular commercial Church and Dwight monohydrate (Runs 1 and 4) which has a good cubical crystal form and Runs 2 and 3 used product monohydrate from laboratory runs at 1st (high temperature 95° C.) (Run 2) and 3rd (low temperature 60° C.) (Run 3) effect conditions.
(c) Seed crystals were added to the crystallizer once per hour through a funnel and stopcock midway between product slurry removals. Seed slurried in feed liquor: 20 gm. in 23 ml. and 40 gm. in 45 ml.

In Run 1A a good quality commercially available synthetically prepared sodium carbonate monohydrate (Church and Dwight) having a mesh size of −80 was employed as the seed crystals. The amount of seed crystals employed approximated 10 percent by weight of monohydrate produced in the crystallizer. In Run 1B no sodium carbonate monohydrate seed crystals were employed. A comparison of the data of Runs 1A and 1B demonstrates the beneficial effect of employing seed crystals as can be seen in the crystal quality of the sodium carbonate monohydrate prepared. Crystal quality, both chemical and physical, was better from the crystallizer employing 10 percent by weight sodium carbonate monohydrate seed, i.e., bulk density was 1050 and crystal shape was good. The sodium carbonate monohydrate produced in Run 1B had a bulk density in the area of 850 to 900 g./l., which is not acceptable for dense soda ash.

In Run 2, the sodium carbonate monohydrate seed employed was the monohydrate prepared in a first effect evaporator crystallizer operated at a temperature of 95° C., a vacuum of approximately 9 inches of mercury, a feed liquor rate of 9 milliliters per minute, an average condensate rate of 4.6 milliliters per minute, and 1.6 crystal bed replacements. The amount of monohydrate seed crystals employed was approximately 10 percent by weight of the total sodium carbonate monohydrate produced. Also, the sodium carbonate monohydrate produced was slightly more irregular having fewer clean single crystals than the sodium carbonate monohydrate produced in Run 1A employing the commercially available sodium carbonate monohydrate seed crystals.

In Run 3, the seed crystals employed were obtained from the third effect crystallizer of Run 1B which did not employ any seed crystals during the crystallization of the sodium carbonate monohydrate from the carbonate process solution. The seed crystals employed were the poorest quality seed crystals used in the runs conducted and the results obtained are reflected in the poor quality sodium carbonate monohydrate obtained, i.e., bulk densities of 900 to 950 g./l. Also, this monohydrate exhibits a greater tendency toward irregular shape and elongation of the monohydrate crystals, both of which contribute to the lower bulk density. However, the sodium carbonate monohydrate produced (Run 3) employing the seed crystals from the third effect of Run 1B was slightly better than the nonseeded sodium carbonate monohydrate produced in Run 1B.

In Run 4, the amount of seed employed was 20 percent by weight and the source of the seed was the commercially available monohydrate employed in Run 1A.

We claim:

1. A process for the preparation of sodium carbonate precursor crystals selected from the group consisting of sodium sesquicarbonate, sodium bicarbonate, anhydrous sodium carbonate and sodium carbonate monohydrate, which comprises passing a carbonate process solution, containing from about 10 to 1,000 parts per million organic carbon, basis sodium carbonate, to a multiple effect evaporative crystallization system comprising three evaporative crystallizers wherein the carbonate process solution is subjected to a first crystallization in the second and third effects of said system to form a first crop of said precursor crystals and a mother liquor, said second and third effects crystallizers have added to them from 2 to about 25 percent by weight of the total weight of the precursor crystals prepared therein, of seed precursor crystals having a particle size of less than about 10 mesh, separating the first crop of said crystals from the mother liquor and subjecting the mother liquor, substantially free of a stable crystal phase of said precursor crystals, to a second crystallization in the first effect crystallizer which is operated at the highest temperature of said system, said crystallizations under evaporative conditions of temperature and pressure to achieve crystallization of said precursor crystals as the only stable crystal phase.

2. The process of claim 1 wherein the sodium carbonate precursor crystals are sodium carbonate monohydrate and crystallization is effected at a temperature within the range of 36° to 109° C.

3. The process of claim 1 wherein the sodium carbonate precursor crystals prepared in the highest temperature effect of the multiple effect crystallization system is the source of the precursor seed crystals for the other effects of the crystallizer unit.

4. The process of claim 1 wherein the second crystallization is effected at a temperature from about 5° to 70° C. above the crystallization temperature in the crystallizer to which the carbonate process solution is first fed.

5. The process of claim 1 wherein the first crystallization is effected at a temperature ranging from about 36° to 99° C. and said second crystallization being effected at a temperature ranging from about 70° to 109° C.

6. The process of claim 1 wherein said first crystallization in the second effect crystallizer is conducted at a temperature ranging from about 53° to 99° C.

7. The process of claim 1 wherein said first crystallization in the third effect crystallizer is conducted at a temperature ranging from about 36° to 85° C.

8. The process of claim 1 wherein the seed particle size is less than 80 mesh.

9. The process of claim 1 wherein the precursor seed crystals are present during crystallization in an amount from about 5 to 20 percent by weight of the sodium carbonate precursor crystals prepared.

* * * * *